United States Patent
Maeda

(10) Patent No.: US 12,179,549 B2
(45) Date of Patent: Dec. 31, 2024

(54) AIR CONDITIONING UNIT FOR VEHICLE

(71) Applicant: DENSO CORPORATION, Kariya (JP)

(72) Inventor: Kenichirou Maeda, Kariya (JP)

(73) Assignee: DENSO CORPORATION, Kariya (JP)

( * ) Notice: Subject to any disclaimer, the term of this patent is extended or adjusted under 35 U.S.C. 154(b) by 218 days.

(21) Appl. No.: 17/872,742

(22) Filed: Jul. 25, 2022

(65) Prior Publication Data

US 2022/0355640 A1  Nov. 10, 2022

Related U.S. Application Data

(63) Continuation of application No. PCT/JP2021/007425, filed on Feb. 26, 2021.

(30) Foreign Application Priority Data

Feb. 28, 2020  (JP) ................... 2020-033307

(51) Int. Cl.
  *B60H 1/00*  (2006.01)
(52) U.S. Cl.
  CPC ..... *B60H 1/00028* (2013.01); *B60H 1/00564* (2013.01); *B60H 2001/00107* (2013.01); *B60H 2001/00185* (2013.01)
(58) Field of Classification Search
  CPC ............ B60H 1/00028; B60H 1/00535; B60H 1/00564; B60H 1/242; B60H 2001/00107; B60H 2001/00185; B60H 2001/00214; B60H 2001/00228; B60H 2001/002
  See application file for complete search history.

(56) References Cited

U.S. PATENT DOCUMENTS

| | | | |
|---|---|---|---|
| 11,938,787 B2 * | 3/2024 | Lee | ........... B60H 3/0608 |
| 2017/0203631 A1 | 7/2017 | Ryu et al. | |
| 2018/0093551 A1 | 4/2018 | Maeda | |
| 2018/0099539 A1 * | 4/2018 | Han | ........... B60H 1/00535 |
| 2019/0366796 A1 | 12/2019 | Omori | |
| 2020/0148025 A1 | 5/2020 | Tashima et al. | |

FOREIGN PATENT DOCUMENTS

| | | |
|---|---|---|
| JP | S6133314 A | 2/1986 |
| JP | 2008126800 A | 6/2008 |
| JP | 2010030408 A | 2/2010 |
| JP | 2017128328 A | 7/2017 |
| WO | WO-2016/170878 A1 | 10/2016 |
| WO | WO-2018168239 A1 | 9/2018 |
| WO | WO-2019021707 A1 | 1/2019 |

* cited by examiner

Primary Examiner — Henry T Crenshaw
Assistant Examiner — Kamran Tavakoldavani
(74) Attorney, Agent, or Firm — Harness, Dickey & Pierce, P.L.C.

(57) ABSTRACT

An air conditioning unit for a vehicle includes: a heat exchanger arranged in an engine compartment partitioned by a fire wall from a cabin; a first case arranged in the engine compartment to house the heat exchanger; and a second case arranged in the cabin to send air from the heat exchanger into the cabin. The fire wall has: a through hole passing through the fire wall so as to connect the first case and the second; and an air passage hole that defines an air passage to send air from the cabin into the engine compartment. The heat exchanger is arranged so that an entire area of the air passage hole is located inside a projection area defined by projecting the heat exchanger from a front to a rear of the vehicle.

11 Claims, 10 Drawing Sheets

(a)　　　　　　　　　　　　　(b)

(a)              (b)

AIR CONDITIONING UNIT FOR VEHICLE

CROSS REFERENCE TO RELATED APPLICATIONS

The present application is a continuation application of International Patent Application No. PCT/JP2021/007425 filed on Feb. 26, 2021, which designated the U.S. and claims the benefit of priority from Japanese Patent Application No. 2020-033307 filed on Feb. 28, 2020. The entire disclosures of all of the above applications are incorporated herein by reference.

TECHNICAL FIELD

The present disclosure relates to an air conditioning unit for a vehicle.

BACKGROUND

An air conditioner includes a refrigerating cycle unit arranged in an engine compartment and a cabin. A vehicle equipped with the air conditioner is provided with a fire wall that separates the engine compartment from the cabin.

SUMMARY

According to one aspect of the present disclosure, an air conditioning unit for a vehicle includes: a heat exchanger arranged in an engine compartment partitioned by a fire wall from a cabin of the vehicle so as to exchange heat between air and refrigerant; a first case arranged in the engine compartment to house the heat exchanger; and a second case arranged in the cabin to send air from the heat exchanger into the cabin. The fire wall has: a through hole passing through the fire wall; and an air passage hole that defines an air passage to send air from the cabin into the engine compartment. The first case and the second case are connected to each other through the through hole formed in the fire wall. The heat exchanger is arranged so that a projection area covers an entire outside of the through hole of the fire wall, the projection area being defined by projecting the heat exchanger from a front to a rear of the vehicle. The heat exchanger is arranged so that an entire area of the air passage hole is located inside the projection area.

DESCRIPTION OF EMBODIMENTS

Figure 1:
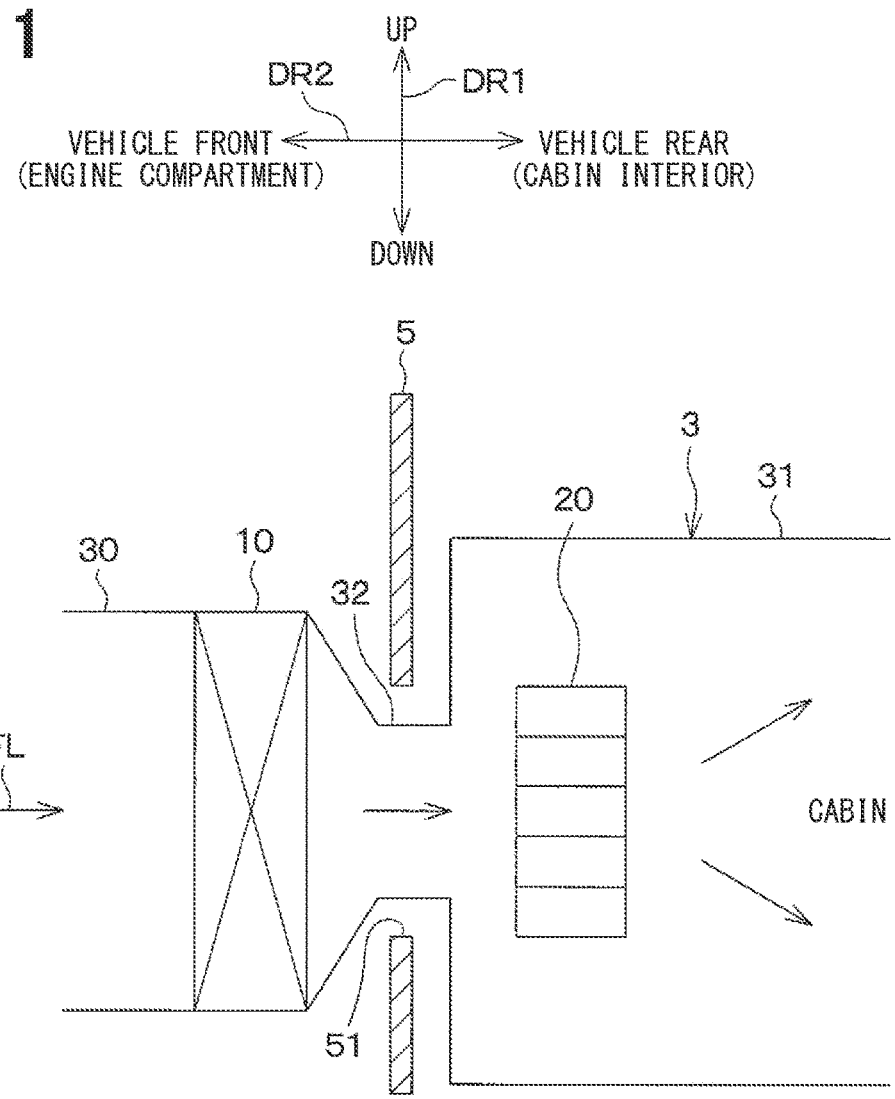
FIG. 1 is a cross-sectional view showing an air conditioning unit according to a first embodiment.

To begin with, examples of relevant techniques will be described.

An air conditioner includes a refrigerating cycle module unit arranged in an engine compartment. The refrigerating cycle module unit has a condenser and an evaporator, which are components of a refrigerating cycle. Further, a distribution unit having a blower and a heater core, which are components of the refrigeration cycle, is arranged in the cabin. Further, the vehicle equipped with this air conditioner is provided with a fire wall that separates the engine compartment and the cabin from each other. The refrigerating cycle module unit and the distribution unit are connected through a through hole in the fire wall.

If the vehicle collides with an object in front of the vehicle, the refrigerating cycle module unit arranged in the engine compartment may collide with the fire wall and the fire wall may be damaged. In this case, various parts in the engine compartment may enter the cabin from this damaged part. It is an object of the present disclosure to provide an air conditioning unit for a vehicle so as to ensure the safety of the cabin in the event of a collision.

According to one aspect of the present disclosure, an air conditioning unit for a vehicle includes: a heat exchanger arranged in an engine compartment partitioned by a fire wall from a cabin of the vehicle so as to exchange heat between air and refrigerant; a first case arranged in the engine compartment to house the heat exchanger; and a second case arranged in the cabin to send air from the heat exchanger into the cabin. The fire wall has a through hole passing through the fire wall. The first case and the second case are connected to each other through the through hole formed in the fire wall. The heat exchanger is arranged so that a projection area covers an entire outside of the through hole of the fire wall, the projection area being defined by projecting the heat exchanger from a front to a rear of the vehicle.

Accordingly, the heat exchanger is arranged so that the projection area of the heat exchanger covers the entire outside of the through hole of the fire wall. Therefore, when the vehicle collides with an object in front of the vehicle, the heat exchanger is received entirely around the peripheral portion of the through hole of the fire wall. Therefore, damage to the fire wall is suppressed, and safety in the cabin can be ensured in the event of a collision.

According to another aspect of the present disclosure, an air conditioning unit for a vehicle includes: a heat exchanger arranged in an engine compartment partitioned by a fire wall from a cabin of the vehicle so as to exchange heat between air and refrigerant; a first case arranged in the engine compartment to house the heat exchanger; and a second case arranged in the cabin to send air from the heat exchanger into the cabin. The fire wall has a through hole passing through the fire wall, the first case and the second case being connected to each other through the through hole. A projection area defined by projecting the heat exchanger from a front to a rear of the vehicle has a rectangular shape. The heat exchanger is arranged so that all corners of the projection area are outside the through hole of the fire wall.

Accordingly, when the vehicle collides with an object in front of the vehicle, all the corners of the heat exchanger are received by the outer peripheral portion of the through hole of the fire wall. Therefore, damage to the fire wall is suppressed, and safety in the cabin can be ensured in the event of a collision.

A reference numeral attached to each component or the like indicates an example of correspondence between the component or the like and specific component or the like described in embodiments below.

Embodiments of the present disclosure will now be described with reference to the drawings. Parts that are identical or equivalent to each other in the following embodiments are assigned the same reference numerals and will not be described.

First Embodiment

An air conditioning unit for a vehicle in a first embodiment will be described hereafter with reference to FIG. 1 to FIG. 4. FIG. 1 is a cross-sectional view showing a configuration of an air conditioning unit for a vehicle, according to the present embodiment. The arrows DR1 and DR2 in FIG. 1 indicate directions when the air conditioning unit is mounted on a vehicle. That is, the arrow DR1 in FIG. 1 indicates a vehicle vertical direction, and the arrow DR2 indicates a vehicle front-rear direction.

In FIG. 1, a part of the air conditioning unit is shown. The air conditioning unit is mounted on a vehicle such as a passenger car. The vehicle is provided with a fire wall 5 that separates the engine compartment and the cabin from each other. The air conditioning unit includes an evaporator 10, an air conditioning case 3, and a blower fan 20.

The evaporator 10 is a heat exchanger that exchanges heat between air and refrigerant. The evaporator 10 constitutes a well-known refrigeration cycle device that circulates refrigerant, together with a compressor, a condenser, and an expansion valve (which are not shown). The evaporator 10 is arranged in the engine compartment relative to the fire wall 5 and cools the air by exchanging heat between the air and the refrigerant. The shape of the evaporator 10 seen from the front side is rectangular. The evaporator 10 is arranged so as to stand upright with respect to the bottom surface of the air conditioning case 3 so that the air passing through the evaporator 10 flows in the horizontal direction.

The air conditioning case 3 is made of a resin member forming the outer shell of the air conditioning unit, and forms an air passage through which air flows into the cabin of the vehicle. The air conditioning case 3 has a first case 30, a second case 31 and a connector 32. The first case 30 houses the evaporator 10. The second case 31 sends the air cooled by the evaporator 10 into the cabin. The connector 32 connects the first case 30 and the second case 31 with each other. The first case 30 is arranged in the engine compartment with respect to the fire wall 5.

The blower fan 20 is housed in the second case 31 and causes an air flow in the air conditioning case 3. The second case 31 and the blower fan 20 are arranged in the cabin relative to the fire wall 5 to blow air cooled by the evaporator 10 toward the cabin.

When the blower fan 20 starts operating, air inside or outside the cabin is introduced into the first case 30. The air introduced into the first case 30 is cooled by the evaporator 10 and then blown into the cabin through the connector 32 and the second case 31.

A through hole 51 penetrating the front and rear is formed in the fire wall 5. The connector 32 is arranged in the through hole 51. The connector 32 is arranged in the through hole 51 of the fire wall 5. The first case 30 is connected to the connector 32 from the engine compartment side, and the second case 31 is connected to the connector 32 from the cabin side.

Each of the first case 30, the connector 32, and the second case 31 has a columnar shape. Further, the passage area of the first case 30 is larger than the passage area of the connector 32, and the passage area of the second case 31 is larger than the passage area of the connector 32.

The first case 30 and the second case 31 are arranged so that the projection area of the first case 30 projected from the front to the rear is inside the projection area of the second case 31 projected from the front to the rear.

Figure 2:
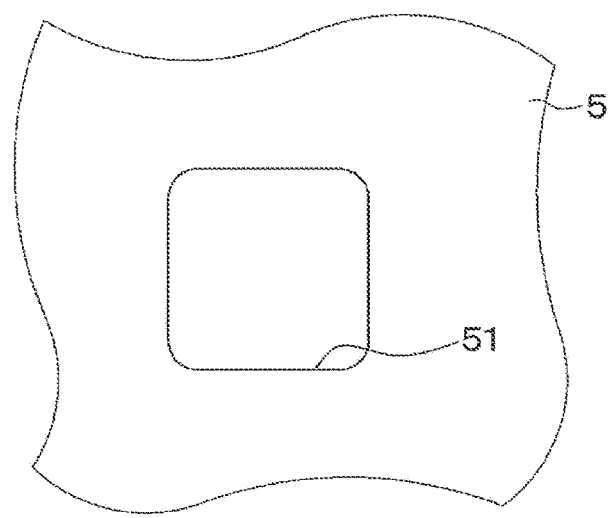
FIG. 2 is a view showing a through hole defined in a fire wall viewed from a front side.

FIG. 2 shows the fire wall 5 as seen from the front side. A through hole 51 is formed in the fire wall 5. The number of the through hole 51 is one in this embodiment. The through hole 51 has a rectangular shape, and the four corners of the through hole 51 are rounded.

Figure 3:
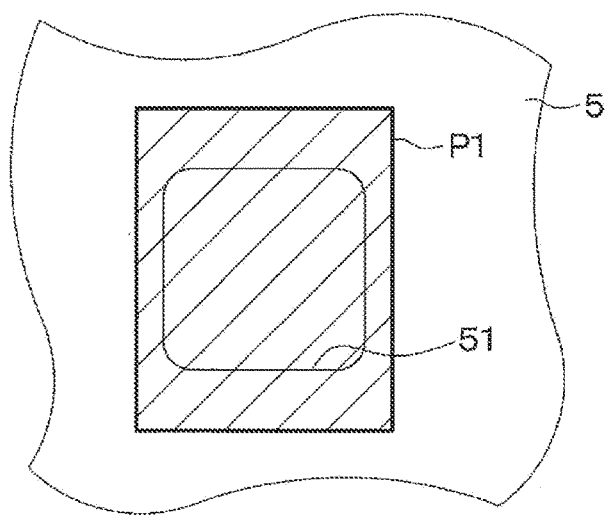
FIG. 3 is a diagram showing a projection area of an evaporator projected from the front side to a rear side and the through hole in an overlapping manner.

FIG. 3 is a diagram showing the projection area P1 of the evaporator 10 projected from the front to the rear and the through hole 51 formed in the fire wall 5 in an overlapping manner. In FIG. 3, the projection area P1 is indicated by diagonal hatching.

As shown in FIG. 3, the projection area P1 covers the entire outside of the through hole 51 of the fire wall 5. In other words, all the periphery edge (360°) of the through hole 51 is covered by the projection area P1. That is, the evaporator 10 is arranged so that the projection area P1 covers the entire outside of the through hole 51 of the fire wall 5.

Figure 4:
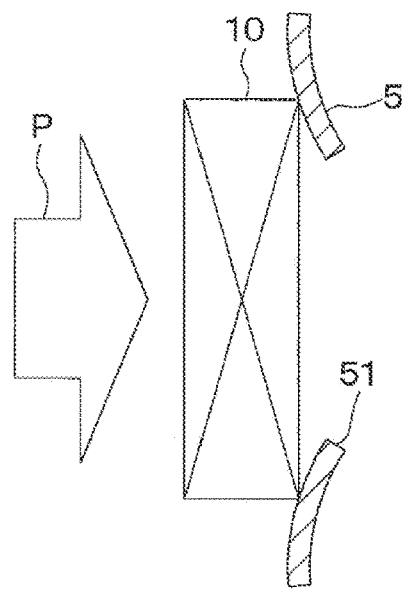
FIG. 4 is a diagram schematically showing the evaporator and the fire wall when a stress is applied to the evaporator.

As a result, when a stress indicated by the arrow P in FIG. 4 is applied to the evaporator 10, the evaporator 10 is received by the outer edge portion of the through hole 51 of the fire wall 5. Therefore, the fire wall 5 is suppressed from being damaged.

Figure 5:
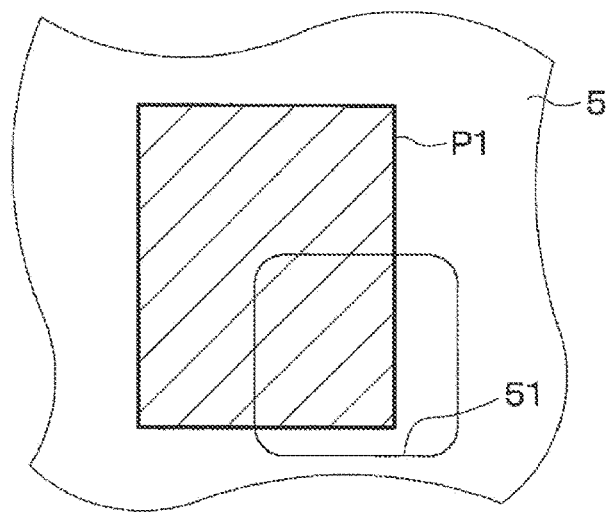
FIG. 5 is a diagram showing a comparative example in which the projection area does not cover the entire outside of the through hole.

FIG. 5 shows a comparative example in which the projection area P1 of the evaporator 10 projected from the front to the rear does not entirely cover the through hole 51 of the fire wall 5.

As shown in FIG. 5, in this comparative example, one corner of the projection area P1 is located inside the through hole 51 of the fire wall 5, and the projection area P1 does not cover the entire outside of the through hole 51 of the fire wall 5.

In this case, when the vehicle collides with an object in front of the vehicle, the fire wall 5 cannot sufficiently receive the evaporator 10, so that the fire wall 5 is liable to be damaged. Then, various parts in the engine compartment may enter the cabin from this damaged part.

As described above, the air conditioning unit of the present embodiment is equipped with the evaporator 10 arranged in the engine compartment with respect to the fire wall 5 that divides the engine compartment from the cabin of the vehicle. In the evaporator 10, heat is exchanged between air and refrigerant. Further, the air conditioning unit is provided with the first case 30 for housing the heat exchanger, and the first case 30 is arranged in the engine compartment with respect to the fire wall 5. The air conditioning unit is provided with the second case 31 arranged in the cabin relative to the fire wall 5 to blow the air that has exchanged heat in the heat exchanger toward the cabin. Further, the through hole 51 penetrating the front and rear is formed in the fire wall 5. The first case 30 and the second case 31 are connected to each other inside the through hole 51 formed in the fire wall 5. The evaporator 10 is arranged so that the projection area P1 of the evaporator 10 projected from the front to the rear covers the entire outside of the through hole 51 of the fire wall 5.

Accordingly, the evaporator 10 is arranged so that the projection area P1 of the evaporator 10 projected from the front to the rear covers the entire outside of the through hole 51 of the fire wall 5. Therefore, when the vehicle collides with an object in front of the vehicle, the evaporator 10 is received by the entire peripheral portion of the through hole 51 of the fire wall 5. Therefore, damage of the fire wall 5 is suppressed, and the safety can be ensured for an occupant in the event of a collision.

Further, the first case 30 and the second case 31 are arranged so that a projection area of the first case 30 projected from the front to the rear is located inside a projection area of the second case 31 projected from the front to the rear.

Second Embodiment

Figure 6:
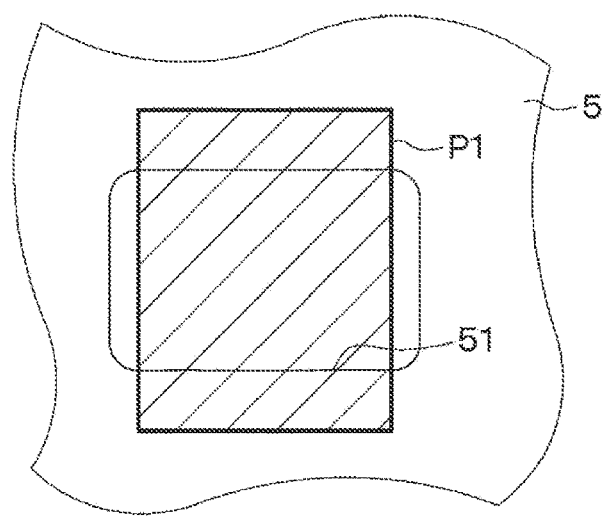
FIG. 6 is a diagram showing a projection area of an evaporator projected from the front side to the rear side and a through hole defined in a fire wall in an overlapping manner, according to a second embodiment.

An air conditioning unit for a vehicle in a second embodiment will be described hereafter with reference to FIG. 6. In the air conditioning unit of the first embodiment, the evaporator 10 is arranged so that the projection area P1 of the evaporator 10 projected from the front to the rear covers the entire outside of the through hole 51 of the fire wall 5. In the air conditioning unit of the present embodiment, as shown in FIG. 6, the projection area P1 of the evaporator 10 projected from the front to the rear has a rectangular shape, and the evaporator 10 is arranged so that all the corners of the projection area P1 are outside the through hole 51 of the fire wall 5.

The number of the through hole 51 formed in the fire wall 5 is one. The through hole 51 has a rectangular shape, and the four corners of the through hole 51 are rounded.

The evaporator 10 is arranged so that the projection area P1 of the evaporator 10 projected from the front to the rear overlaps the upper and lower sides of the through hole 51 opposing to each other and does not overlap with the left and right sides of the through hole 51 opposing to each other.

That is, the evaporator 10 is arranged so that all the corners of the projection area P1 of the evaporator 10 projected from the front to the rear are outside the through hole 51 of the fire wall 5.

As a result, when the vehicle collides with an object in front of the vehicle and a stress is applied to the evaporator 10 from the front to the rear, all the corners of the evaporator 10 are received by the outer edge portion of the through hole 51 of the fire wall 5. Therefore, damage of the fire wall 5 is suppressed.

According to the air conditioning unit of the present embodiment, the evaporator 10 is arranged in the engine compartment with respect to the fire wall 5 that divides the engine compartment from the cabin of the vehicle, and heat is exchanged between air and refrigerant in the evaporator 10. The air conditioning unit has the first case 30 arranged in the engine compartment relative to the fire wall 5 to house the evaporator 10. Further, the air conditioning unit is provided with the second case 31 arranged in the cabin with respect to the fire wall 5 to blow the air that has exchanged heat in the heat exchanger toward the cabin. Further, the through hole 51 penetrating the front and rear is formed in the fire wall 5, and the first case 30 and the second case 31 are connected to each other inside the through hole 51 formed in the fire wall 5. The projection area P1 of the evaporator 10 projected from the front to the rear has a rectangular shape, and the evaporator 10 is arranged so that all the corners of the projection area P1 are located outside the through hole 51 of the fire wall 5.

Accordingly, when the vehicle collides with an object in front of the vehicle, all the corners of the evaporator 10 are received by the peripheral edge of the through hole 51 of the fire wall 5. Therefore, damage of the fire wall 5 is suppressed, and the safety can be ensured for an occupant of the vehicle in the event of a collision.

In this embodiment, the evaporator 10 is arranged so that the projection area P1 of the evaporator 10 projected from the front to the rear overlaps with the upper and lower sides of the through hole 51 and does not overlap with the left and right sides of the through hole 51.

Figure 7:
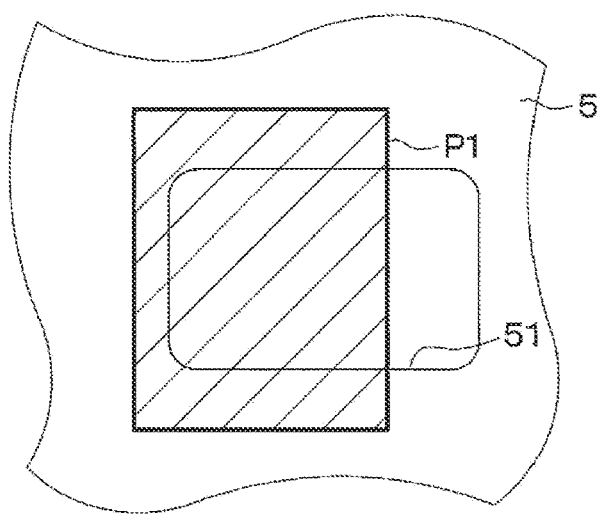
FIG. 7 is a diagram for explaining a modification of the second embodiment.

Alternatively, as shown in FIG. 7, the evaporator 10 may be arranged so that the projection area P1 of the evaporator 10 projected from the front to the rear overlaps with one of the left and right sides of the through hole 51 and does not overlap with the other of the left and right sides of the through hole 51.

Third Embodiment

An air conditioning unit for a vehicle in a third embodiment will be described hereafter with reference to FIG. 8. In the second embodiment, the projection area P1 of the evaporator 10 projected from the front to the rear has a rectangular shape, and the evaporator 10 is arranged so that all the corners of the projection area P1 are positioned outside the through hole 51 of the fire wall 5. In the present embodiment, a projection area P2 of the core portion 11 of the evaporator 10 projected from the front to the rear has a rectangular shape, and the evaporator 10 is arranged so that all the corners of the projection area P2 are positioned outside the through hole 51 of the fire wall 5.

The evaporator 10 includes the core portion 11 having tubes through which the refrigerant passes, and header tank portions 12 and 13 arranged at respective ends of the core portion 11 to communicate the tubes. The core portion 11 and the header tank portions 12 and 13 are made of a metal material having high thermal conductivity such as aluminum.

The core portion 11 includes refrigerant tubes and corrugated fins. The refrigerant tube has a flat shape in the cross section and in communication with the header tank portion 12 and the header tank portion 13. The corrugated fin has a corrugated shape and is interposed between two refrigerant tubes adjacent to each other. The refrigerant tubes and the corrugated fins are alternately stacked in one direction in the core portion 11. The strength of the core portion 11 is lower than that of the header tank portion 12, 13.

The header tank portion 12 is arranged on the upper side of the core portion 11 in the vertical direction, and the header tank portion 13 is arranged on the lower side of the core portion 11 in the vertical direction.

The projection area P2 of the core portion 11 of the evaporator 10 projected from the front to the rear has a rectangular shape, and the evaporator 10 is arranged so that all the corners of the projection area P2 are positioned outside the through hole 51 of the fire wall 5.

As a result, when the vehicle collides with an object in front of the vehicle and a stress is applied to the evaporator 10 from the front to the rear, the four corners of the evaporator 10 are received by the outer edge of the through hole 51 of the fire wall 5. Therefore, damage of the fire wall 5 is suppressed.

Figure 9:
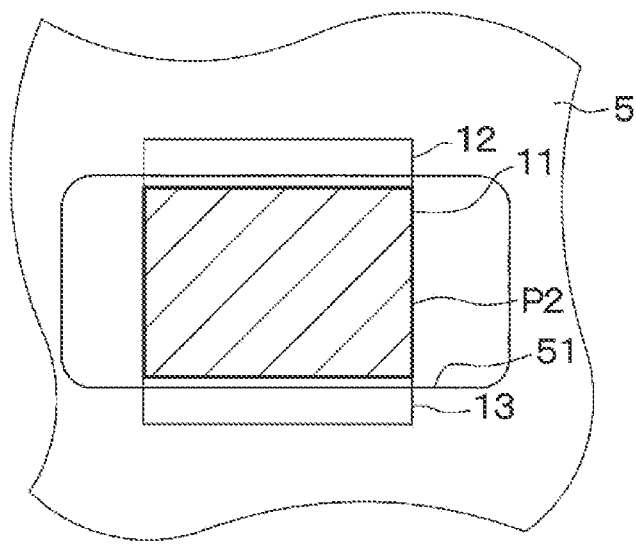
FIG. 9 is a diagram showing a comparative example in which an evaporator is arranged so that all corners of a projection area of a core portion of the evaporator projected from the front side to the rear side are inside the through hole of the fire wall.

FIG. 9 illustrates a comparison example in which the evaporator 10 is arranged so that all the corners of the projection area P2 of the core portion 11 of the evaporator 10 projected from the front to the rear are positioned inside the through hole 51 of the fire wall 5.

In this example, the projection area of the header tank portion 12 projected from the front to the rear overlaps with the upper side of the through hole 51 of the fire wall 5 in the vertical direction. Further, the projection area of the header tank portion 13 projected from the front to the rear overlaps with the lower side of the through hole 51 of the fire wall 5 in the vertical direction.

In the comparison example, when the vehicle collides with an object in front of the vehicle and a stress is applied to the evaporator 10 from the front to the rear, the header tank portion 12 is in contact with the upper side of the through hole 51 of the fire wall 5 in the vertical direction. Further, the header tank portion 13 comes into contact with the lower side of the through hole 51 of the fire wall 5 in the vertical direction. The upper and lower sides of the through hole 51 of the fire wall 5 are easily damaged. Then, various parts in the engine compartment may enter the cabin from this damaged part.

Figure 8:
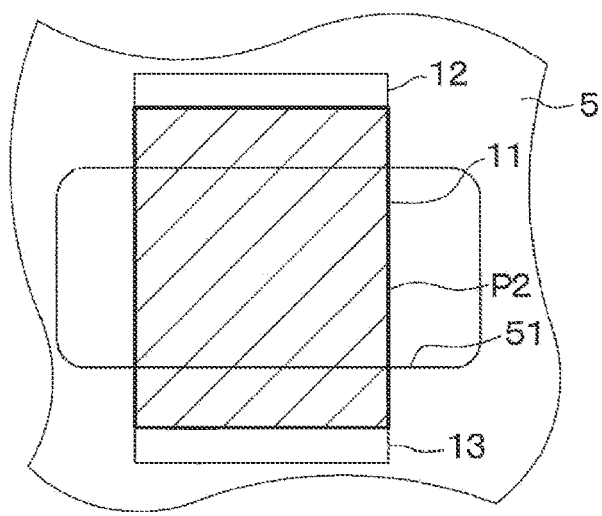
FIG. 8 is a diagram showing a projection area of an evaporator projected from the front side to the rear side and a through hole defined in a fire wall in an overlapping manner, according to a third embodiment.

Therefore, as shown in FIG. 8, it is preferable to arrange the evaporator 10 so that the projection area P2 of the core portion 11 of the evaporator 10 projected from the front to the rear has a rectangular shape and all the corners of the projection area P2 are positioned outside the through hole 51 of the fire wall 5.

This makes it possible to restrict the header tank portions 12 and 13 from coming into contact with the fire wall 5 and damaging the fire wall 5.

In the present embodiment, similar effects can be obtained as in the second embodiment.

As in the first embodiment, it is possible to arrange the evaporator 10 such that the projection area P2 of the core portion 11 of the evaporator 10 projected from the front to the rear covers the entire outside of the through hole 51 of the fire wall 5.

Further, in the present embodiment, the header tank portions 12 and 13 are arranged at the upper side and the lower side of the core portion 11 respectively, and the evaporator 10 is arranged so that all the corners of the projection area P2 of the core portion 11 projected from the front to the rear are positioned outside the through hole 51 of the wall 5.

Figure 10:
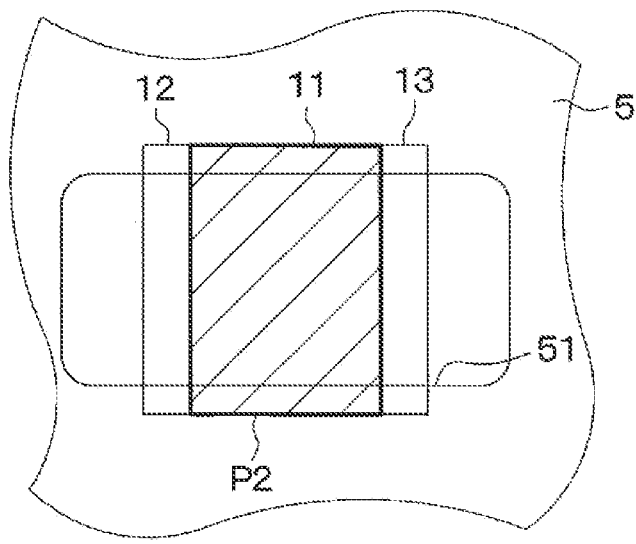
FIG. 10 is a diagram for explaining a modification of the third embodiment.

Alternatively, as shown in FIG. 10, the header tank portions 12 and 13 are arranged on the left and right sides of the core portion 11 respectively, and all of the corners of the projection area P2 of the core portion 11 projected from the front to the rear are outside the through hole 51 of the fire wall 5.

Fourth Embodiment

Figure 11:
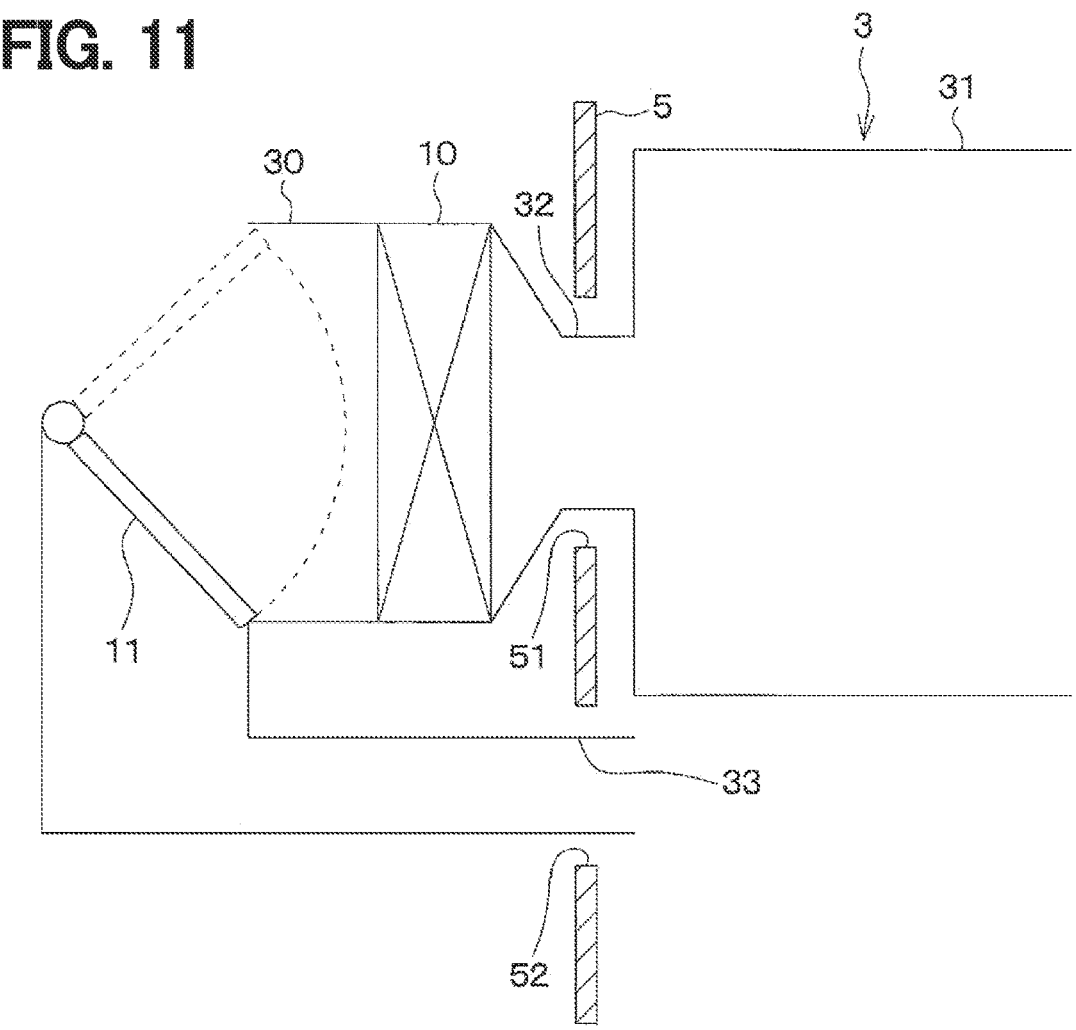
FIG. 11 is a cross-sectional view showing an air conditioning unit for a vehicle according to a fourth embodiment.

An air conditioning unit for a vehicle in a fourth embodiment will be described hereafter with reference to FIG. 11 and FIG. 12. As shown in FIG. 11, the fire wall 5 of the vehicle equipped with the air conditioning unit of the present embodiment has an air passage hole 52, in addition to the through hole 51. The air passage hole 52 defines an air passage 33 for guiding the air from the cabin to the engine compartment. That is, the fire wall 5 has the through hole 51 and the air passage hole 52 separately.

The air passage 33 is integrally formed with the first case 30, and forms an air passage that guides the air from the cabin toward the engine compartment. The air passage hole 52 is located on the lower side the through hole 51 in the vertical direction, in the fire wall 5.

Figure 12:
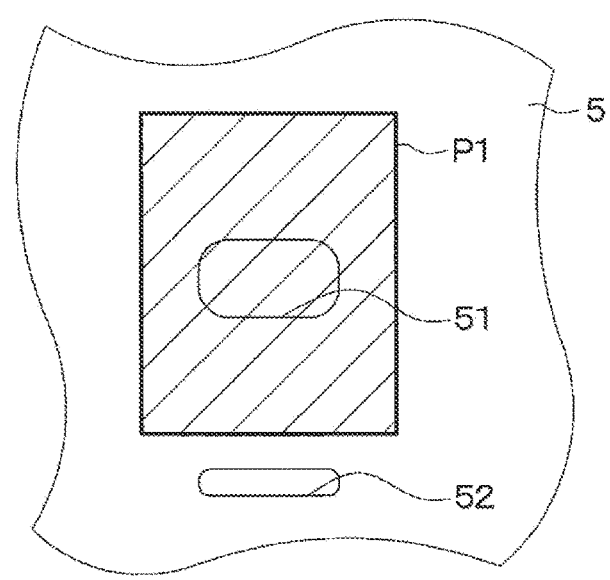
FIG. 12 is a diagram showing a projection area of an evaporator projected from the front side to the rear side, a through hole and an air passage hole in an overlapping manner, according to a fourth embodiment.

As shown in FIG. 12, the evaporator 10 is arranged such that a whole of the air passage hole 52 formed in the fire wall 5 is located outside the projection area P1 of the evaporator 10 projected from the front to the rear. That is, the air passage hole 52 is arranged so as not to overlap the projection area P1 of the evaporator 10 projected from the front to the rear.

With such a configuration, when the vehicle collides with an object in front of the vehicle, the fire wall 5 is restricted from being damaged by a load applied from the evaporator 10 to the periphery of the air passage hole 52 of the fire wall 5.

Fifth Embodiment

An air conditioning unit for a vehicle in a fifth embodiment will be described hereafter with reference to FIG. 13 and FIG. 14. In the fourth embodiment, the evaporator 10 is arranged so that the air passage hole 52 formed in the fire wall 5 is located outside the projection area P1 of the evaporator 10 projected from the front to the rear. In the present embodiment, as shown in FIGS. 13 and 14, the evaporator 10 is arranged so that the entire area of the air passage hole 52 formed in the fire wall 5 is located inside the projection area P1 of the evaporator 10 projected from the front to the rear.

In the present embodiment, the evaporator 10 is arranged so that the projection area P1 of the evaporator 10 projected from the front to the rear overlaps with the through hole 51 and the air passage hole 52.

Figure 13:
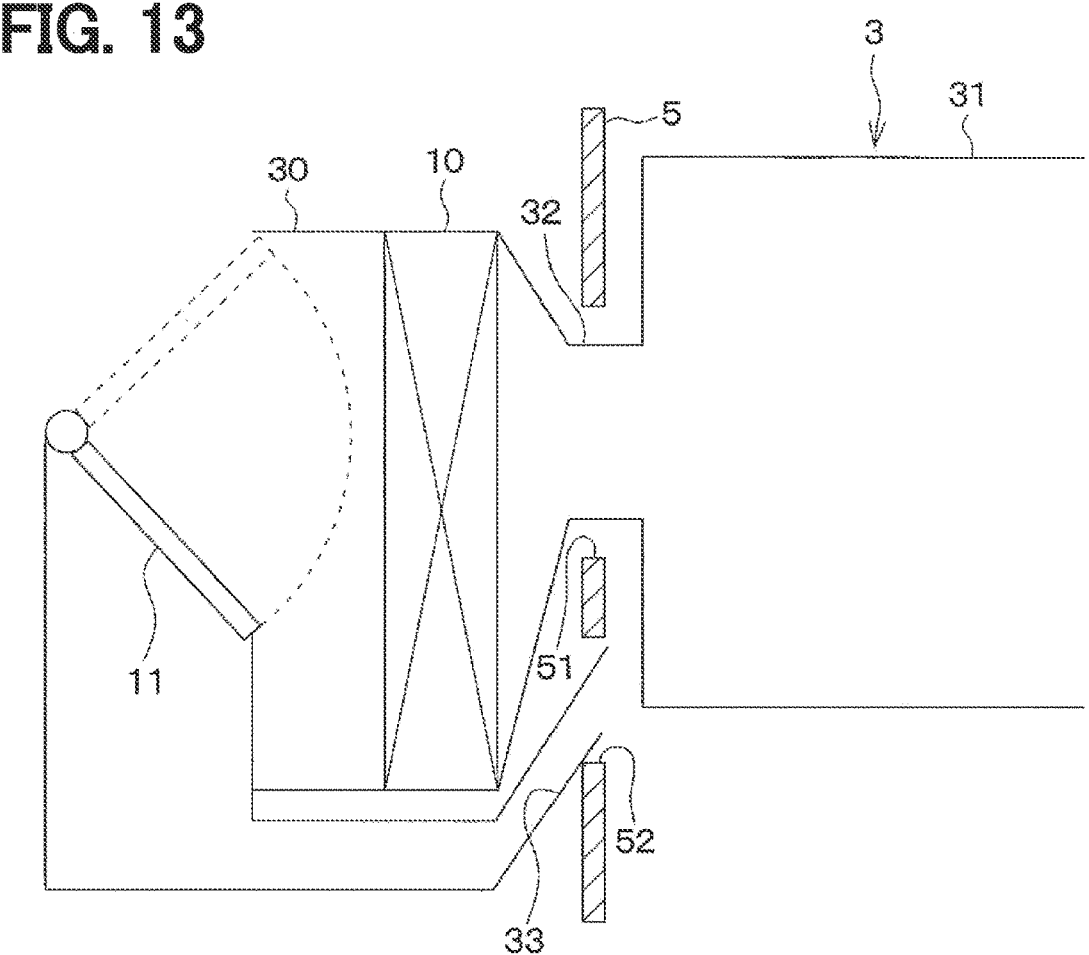
FIG. 13 is a cross-sectional view showing an air conditioning unit for a vehicle according to a fifth embodiment.
Figure 14:
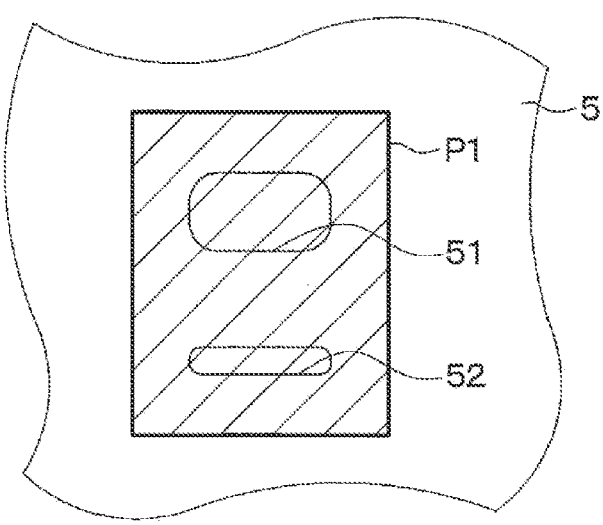
FIG. 14 is a diagram showing a projection area of an evaporator projected from the front side to the rear side, a through hole and an air passage hole in an overlapping manner, according to a fifth embodiment.

As described above, in the present embodiment, as shown in FIGS. 13 and 14, the evaporator 10 is arranged so that the entire areas of the through hole 51 and the air passage hole 52 formed in the fire wall 5 is positioned inside the projection area P1 of the evaporator 10 projected from the front to the rear.

With such a configuration, when the vehicle collides with an object in front of the vehicle, the fire wall 5 is restricted from being damaged by a load applied from the evaporator 10 to the periphery of the air passage hole 52 of the fire wall 5.

The through hole 51 and the air passage hole 52 may be formed as a single hole portion, and the evaporator 10 can be arranged so that all the corners of the projection area P1 of the evaporator 10 projected from the front to the rear are located outside the single hole portion of the fire wall 5.

Sixth Embodiment

Figure 15:
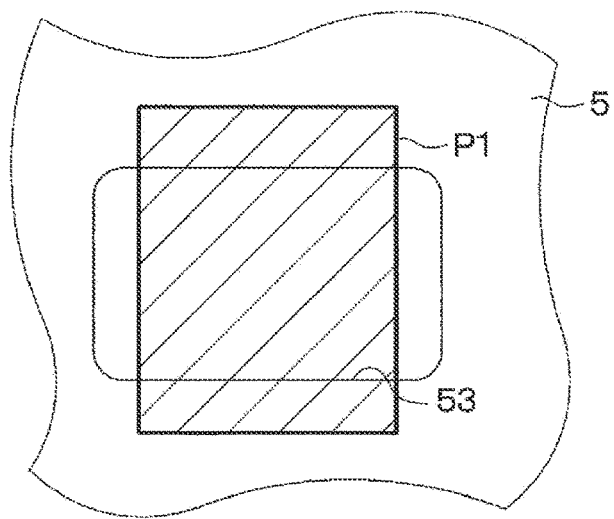
FIG. 15 is a diagram showing a projection area of an evaporator projected from the front side to the rear side and a single hole portion formed in a fire wall in an overlapping manner, according to a sixth embodiment.

The air conditioning unit for a vehicle in a sixth embodiment will be described hereafter with reference to FIG. 15. In the present embodiment, as shown in FIG. 15, the through hole 51 and the air passage hole 52 are formed in the fire wall 5 as a single hole portion 53. Further, the four corners of the single hole portion 53 are rounded.

The projection area P1 of the evaporator 10 projected from the front to the rear has a rectangular shape, and the evaporator 10 is arranged such that all the corners of the projection area P1 are located outside the single hole portion 53 of the fire wall 5.

In this way, the through hole 51 and the air passage hole 52 are formed as the single hole portion 53, and the evaporator 10 may be arranged so that all the corners of the projection area P1 of the evaporator 10 projected from the front to the rear are located outside the single hole portion 53 of the fire wall 5.

With such a configuration, when the vehicle collides with an object in front of the vehicle, the fire wall 5 can be restricted from being damaged by a load applied from the evaporator 10 to the periphery of the single hole portion 53 of the fire wall 5.

The through hole 51 and the air passage hole 52 are formed as the single hole portion 53, and the evaporator 10 can be arranged so the projection area P1 of the evaporator 10 projected from the front to the rear covers the entire outside of the single hole portion 53 of the fire wall 5.

Seventh Embodiment

Figure 16:
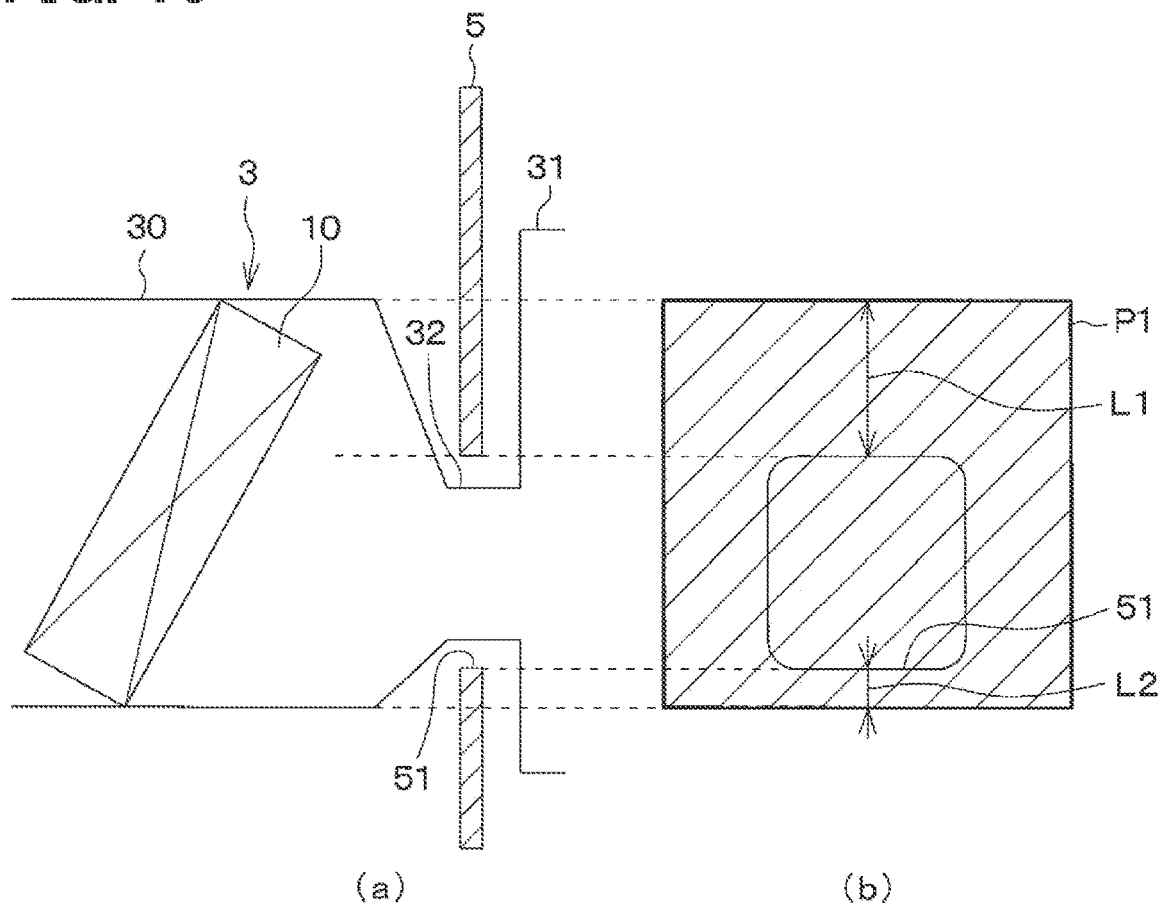
FIG. 16 is a cross-sectional view showing an air conditioning unit for a vehicle according to a seventh embodiment, and a projection area of an evaporator projected from the front side to the rear side and a through hole formed in a fire wall.

The air conditioning unit for a vehicle in a seventh embodiment will be described hereafter with reference to FIG. 16. In FIG. 16, (a) illustrates a cross-sectional view showing the configuration of the air conditioning unit, and (b) illustrates the projection area P1 of the evaporator projected from the front to the rear and the through hole 51 formed in the fire wall 5 in the overlapped manner.

In the air conditioning unit of the present embodiment, the evaporator 10 is arranged so as to be inclined with respect to the bottom surface of the air conditioning case 3 so that the air passing through the evaporator 10 flows downward relative to the horizontal direction.

That is, the evaporator 10 is arranged so as to be inclined so that the upper end of the evaporator 10 in the vehicle direction is located closer to the fire wall 5 than the lower end of the evaporator 10 in the vehicle direction is. Further, the length L1 between the upper end of the through hole 51 and the upper end of the projection area P1 is longer than the length L2 between the lower end of the through hole 51 and the lower end of the projection area P1. The overlapping area between the projection area P1 and the upward area of the through hole 51 is larger than the overlapping area between the projection area P1 and the downward area of the through hole 51.

That is, the overlapping area between the projection area P1 and the fire wall 5 is larger in an area adjacent to the upper end of the evaporator 10, which is closer to the fire wall 5, than in an area adjacent to the lower end of the evaporator 10, which is farther from the fire wall 5.

For example, when the vehicle collides with an object in front of the vehicle, the upper end of the evaporator 10 near the fire wall 5 collides with the fire wall 5 prior to the lower end of the evaporator 10, and a large impact is applied to the fire wall 5 at the upward area of the through hole 51. After that, the lower end of the evaporator 10 collides with the fire wall 5. At this time, the evaporator 10 is received by the outer edge of the through hole 51 of the fire wall 5.

In the present embodiment, the overlapping area with the projection area P1 is larger in the area of the fire wall 5 upper than the through hole 51 than in the area of the fire wall 5 lower than the through hole 51. Therefore, the strength of the fire wall 5 in the upward direction of the through hole 51 can be ensured, and the resistance of the fire wall 5 to an impact can be ensured.

Eighth Embodiment

Figure 17:
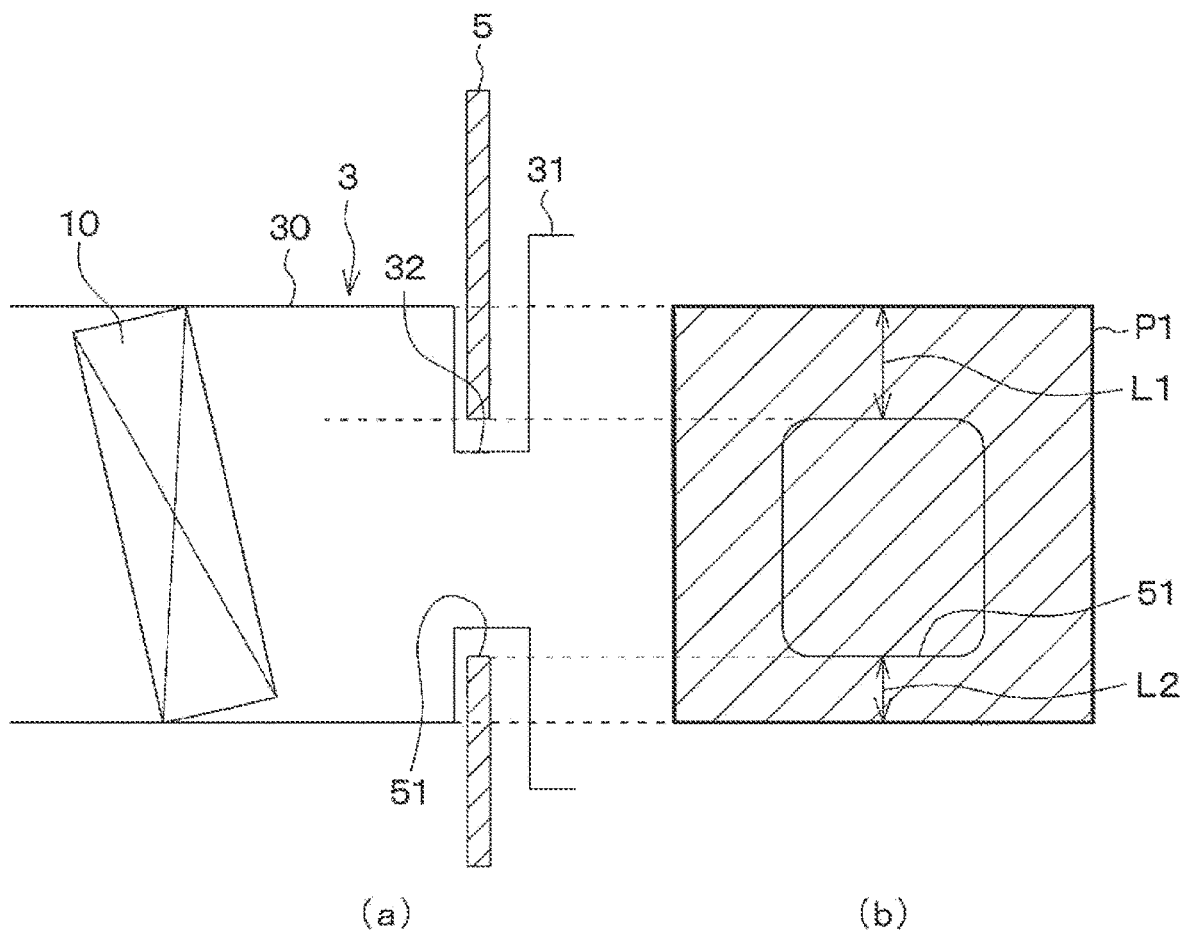
FIG. 17 is a cross-sectional view showing an air conditioning unit for a vehicle according to an eighth embodiment, and a projection area of an evaporator projected from the front side to the rear side and a through hole formed in a fire wall.

The air conditioning unit for a vehicle in an eighth embodiment will be described hereafter with reference to FIG. 17. In FIG. 17, (a) illustrates a cross-sectional view of the air conditioning unit, and (b) shows a projection area of an evaporator projected from the front to the rear and a through hole formed in a fire wall in the overlapped manner.

In the air conditioning unit of the present embodiment, the evaporator 10 is arranged so as to be inclined with respect to the bottom surface of the air conditioning case 3 so that the air passing through the evaporator 10 flows upward relative to the horizontal direction.

That is, the evaporator 10 is arranged so as to be inclined so that the lower end of the evaporator 10 is located closer to the fire wall 5 than the upper end of the evaporator 10 is.

Further, the length L1 between the upper end of the through hole 51 and the upper end of the projection area P1 is longer than the length L2 between the lower end of the through hole 51 and the lower end of the projection area P1. The overlapping area between the projection area P1 and the upward area of the fire wall 5 upper than the through hole 51 is larger than the overlapping area between the projection area P1 and the downward direction of the fire wall 5 lower than the through hole 51.

As described above, the evaporator 10 can be arranged so as to be inclined so that the upper end of the evaporator 10 is closer to the fire wall 5 than the lower end of the evaporator 10 is. The overlapping area between the projection area P1 and the fire wall 5 is larger in the upward area upper than the through hole 51 than in the downward area lower than the through hole 51.

Ninth Embodiment

Figure 18:
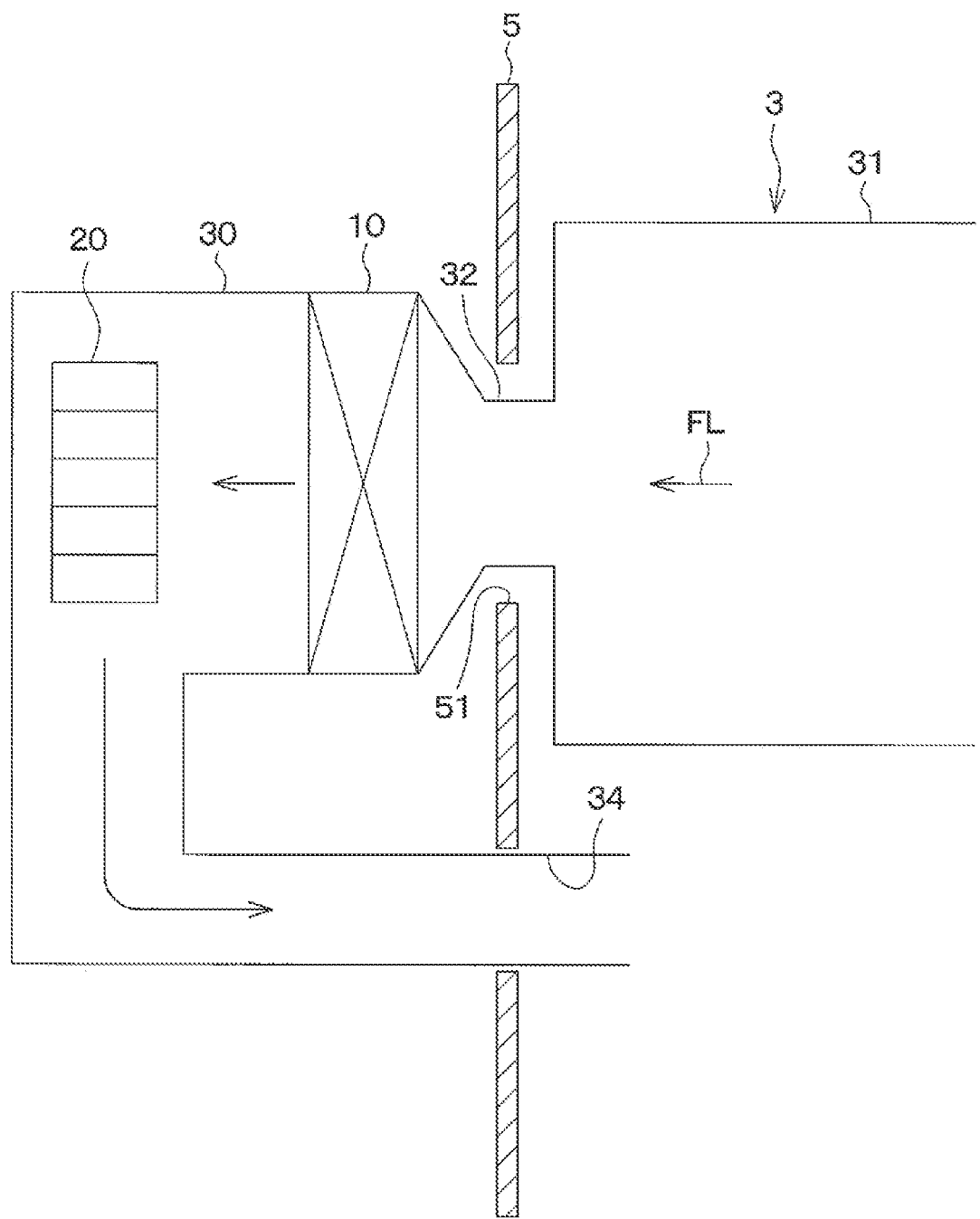
FIG. 18 is a cross-sectional view showing an air conditioning unit for a vehicle according to a ninth embodiment.

The air conditioning unit for a vehicle in a ninth embodiment will be described hereafter with reference to FIG. 18.

In the above embodiments, the blower fan 20 is arranged in the second case 31 to generate an air flow from the first case 30 toward the second case 31. In the present embodiment, as shown in FIG. 17, the blower fan 20 may be arranged in the first case 30 so as to generate an air flow from the second case 31 toward the first case 30.

The blower fan 20 and the evaporator 10 are arranged in the first case 30. The evaporator 10 is arranged between the blower fan 20 and the second case 31. Further, the first case 30 is formed with an air passage 34 for blowing air into the cabin from the first case 30 arranged in the engine compartment.

When the blower fan 20 starts operating, the air in the cabin is introduced into the second case 31. The air introduced into the second case 31 is introduced into the first case 30 through the connector 32, and is cooled by the evaporator 10 so as to be blown into the cabin through the air passage 34.

Tenth Embodiment

Figure 19:
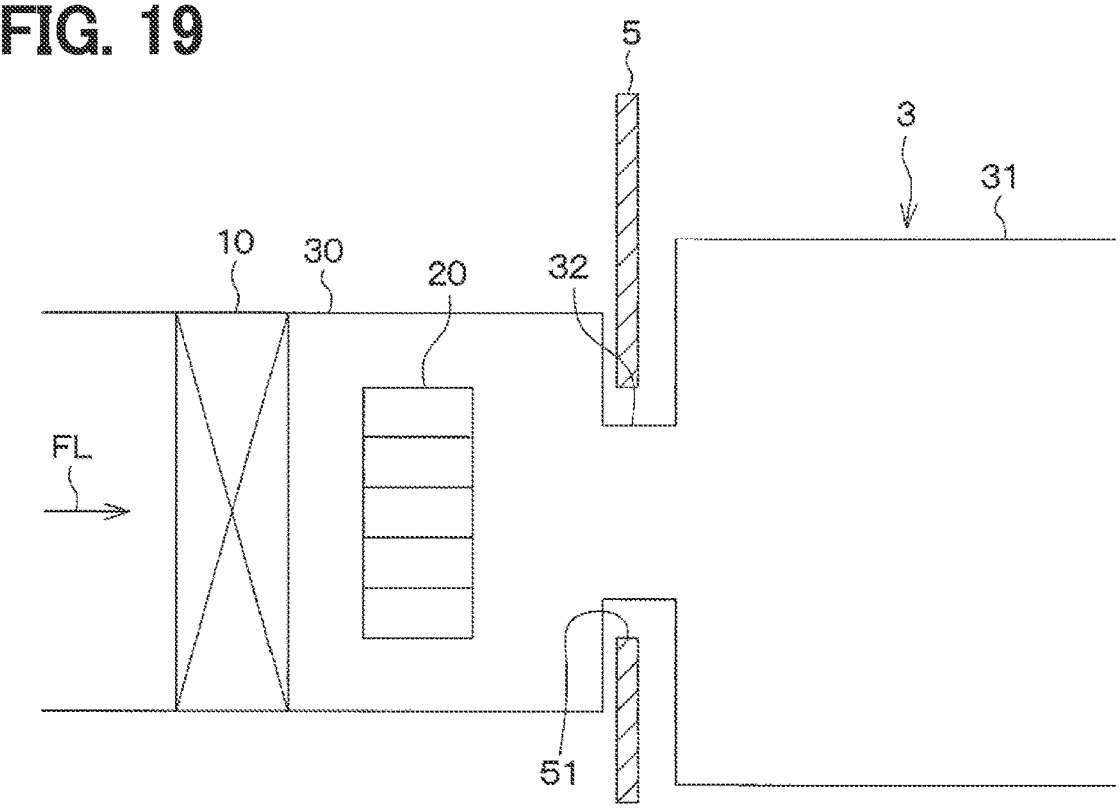
FIG. 19 is a cross-sectional view showing an air conditioning unit for a vehicle according to a tenth embodiment.

The air conditioning unit for a vehicle in a tenth embodiment will be described hereafter with reference to FIG. 19. In the present embodiment, the blower fan 20 and the evaporator 10 are arranged in the first case 30. Further, the blower fan 20 is arranged between the evaporator 10 and the second case 31.

In this way, the blower fan 20 and the evaporator 10 can be arranged in the first case 30 arranged in the engine compartment of the vehicle, and the blower fan 20 can be arranged between the evaporator 10 and the second case 31.

Eleventh Embodiment

Figure 20:
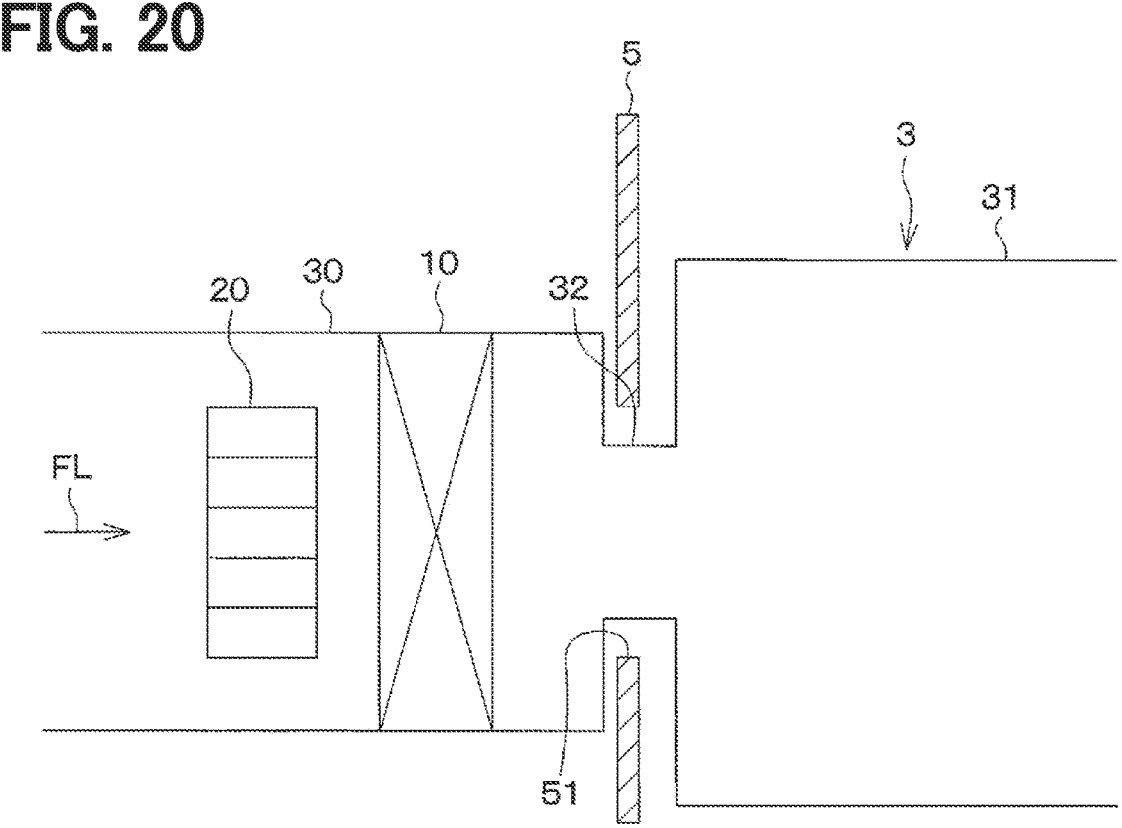
FIG. 20 is a cross-sectional view showing an air conditioning unit for a vehicle according to an eleventh embodiment.

The air conditioning unit for a vehicle in an eleventh embodiment will be described hereafter with reference to FIG. 20. In the present embodiment, the blower fan 20 and the evaporator 10 are arranged in the first case 30. Further, the evaporator 10 is arranged between the blower fan 20 and the second case 31.

In this way, the blower fan 20 and the evaporator 10 can be arranged in the first case 30 arranged in the engine compartment of the vehicle, and the evaporator 10 can be arranged between the blower fan 20 and the second case 31.

Other Embodiments (1) In each of the embodiments, the first case 30 and the second case 31 are connected via the connector 32, but the first case 30 and the second case 31 may be directly connected.

The present disclosure is not limited to the above embodiments, and can be appropriately modified. Individual elements or features of a particular embodiment are generally not limited to that particular embodiment, but, where applicable, are interchangeable and can be used in a selected embodiment, even if not specifically shown or described. Further, in each of the above-mentioned embodiments, it goes without saying that components of the embodiment are not necessarily essential except for a case in which the components are particularly clearly specified as essential components, a case in which the components are clearly considered in principle as essential components, and the like. A quantity, a value, an amount, a range, or the like, if specified in the above-described example embodiments, is not necessarily limited to the specific value, amount, range, or the like unless it is specifically stated that the value, amount, range, or the like is necessarily the specific value, amount, range, or the like, or unless the value, amount, range, or the like is obviously necessary to be the specific value, amount, range, or the like in principle. Further, in each of the embodiments described above, when referring to the material, shape, positional relationship, and the like of the components and the like, except in the case where the components are specifically specified, and in the case where the components are fundamentally limited to a specific material, shape, positional relationship, and the like, the components are not limited to the material, shape, positional relationship, and the like.

According to the first aspect shown in part or all of the embodiments, an air conditioning unit for a vehicle includes: a heat exchanger arranged in an engine compartment partitioned by a fire wall from a cabin of the vehicle so as to exchange heat between air and refrigerant; a first case arranged in the engine compartment to house the heat exchanger; and a second case arranged in the cabin to send air from the heat exchanger into the cabin. The fire wall has a through hole passing through the fire wall. The first case and the second case are connected to each other inside the through hole formed in the fire wall. The heat exchanger is arranged so that a projection area covers an entire outside of the through hole of the fire wall, the projection area being defined by projecting the heat exchanger from a front to a rear of the vehicle.

According to the second aspect, the fire wall has an air passage hole forming an air passage through which air flows between the cabin and the engine compartment. The heat exchanger is arranged so that the entire area of the air passage hole is outside the projection area.

Accordingly, when the vehicle collides with an object in front of the vehicle, the heat exchanger is restricted from damaging the fire wall by applying a load around the air passage hole of the fire wall.

According to the third aspect, the fire wall is formed with an air passage hole forming an air passage through which air flows between the cabin and the engine compartment. The heat exchanger is arranged so that the entire area of the air passage hole is inside the projection area.

Accordingly, when the vehicle collides with an object in front of the vehicle, the heat exchanger is restricted from damaging the fire wall by applying a load around the air passage hole of the fire wall.

Further, according to the fourth aspect, the through hole and the air passage hole are formed in the fire wall as a single hole portion. The heat exchanger is arranged so that the projection area of the heat exchanger covers the entire outside of the single hole portion in the fire wall.

Accordingly, when the vehicle collides with an object in front of the vehicle, the heat exchanger is restricted from damaging the fire wall by applying a load around the single hole portion of the fire wall.

Further, according to the fifth aspect, an air conditioning unit for a vehicle includes: a heat exchanger arranged in an engine compartment partitioned by a fire wall from a cabin of the vehicle so as to exchange heat between air and refrigerant; a first case arranged in the engine compartment to house the heat exchanger; and a second case arranged in the cabin to send air from the heat exchanger into the cabin. The fire wall has a through hole passing through the fire wall, the first case and the second case being connected to each other inside the through hole. A projection area defined by projecting the heat exchanger from a front to a rear of the vehicle has a rectangular shape. The heat exchanger is arranged so that all corners of the projection area are outside the through hole of the fire wall.

According to the sixth aspect, the fire wall has an air passage hole forming an air passage through which air flows between the cabin and the engine compartment. The heat exchanger is arranged so that the entire area of the air passage hole is outside the projection area.

Accordingly, when the vehicle collides with an object in front of the vehicle, the heat exchanger is restricted from damaging the fire wall by applying a load around the air passage hole of the fire wall.

Further, according to the seventh aspect, the fire wall has an air passage hole forming an air passage through which air flows between the cabin and the engine compartment. The heat exchanger is arranged so that all the corners of the projection area are outside the through hole and the air passage hole of the fire wall.

Accordingly, when the vehicle collides with an object in front of the vehicle, the heat exchanger is restricted from damaging the fire wall by applying a load around the air passage hole of the fire wall.

Further, according to the eighth aspect, the through hole and the air passage hole are formed in the fire wall as a single hole portion. The heat exchanger is arranged so that all the corners of the projection area are outside the single hole portion in the fire wall.

Accordingly, when the vehicle collides with an object in front of the vehicle, the heat exchanger is restricted from damaging the fire wall by applying a load around the single hole portion of the fire wall.

Further, according to the ninth aspect, the heat exchanger includes a core portion having tubes through which refrigerant passes, and header tanks arranged at both ends of the core portion to communicate the tubes with each other. The projection area is defined by projecting the core portion from the front to the rear of the vehicle.

In this way, the core portion can be used for defining the projection area.

Further, according to the tenth aspect, the heat exchanger is arranged so as to be inclined so that the upper end of the heat exchanger is closer to the fire wall than the lower end of the heat exchanger is. The overlapping area between the projection area and the fire wall is larger on the upper side of the through hole than on the lower side of the through hole.

In this case, when the vehicle collides with an object in front of the vehicle, the upper end of the evaporator 10 near the fire wall 5 collides with the fire wall 5 prior to the lower end, and a large impact is applied to the fire wall 5 in the area upper than the through hole 51. After that, the lower end of the evaporator 10 collides with the fire wall 5. At this time, the evaporator 10 is received around the outer peripheral portion of the through hole 51 of the fire wall 5.

In the above configuration, the overlapping area between the projection area and the fire wall is larger in the upward direction of the through hole than in the downward direction of the through hole. Therefore, the strength of the fire wall in the upward direction of the through hole can be ensured, and the resistance of the fire wall to an impact can be ensured.

What is claimed is:

1. An air conditioning unit for a vehicle comprising:
a heat exchanger arranged in an engine compartment partitioned by a fire wall from a cabin of the vehicle so as to exchange heat between air and refrigerant;
a first case arranged in the engine compartment to house the heat exchanger; and
a second case arranged in the cabin to send air from the heat exchanger into the cabin, wherein
the fire wall has
a through hole passing through the fire wall, the first case and the second case being connected to each other inside the through hole, and
an air passage hole that defines an air passage to send air from the cabin into the engine compartment,
the heat exchanger includes a core portion through which a refrigerant passes and header tanks arranged at respective ends of the core portion to communicate with the core portion,
the heat exchanger is arranged so that a projection area covers an entire outside of the through hole of the fire wall, the projection area being defined by projecting the core portion from a front to a rear of the vehicle, and
the heat exchanger is arranged so that an entire area of the air passage hole is located inside the projection area.

2. The air conditioning unit according to claim 1, wherein the through hole and the air passage hole are formed in the fire wall as a single hole portion, and
the heat exchanger is arranged so that the projection area covers an entire outside of the single hole portion of the fire wall.

3. The air conditioning unit according to claim 1, wherein the heat exchanger is arranged so as to be inclined so that an upper end of the heat exchanger is closer to the fire wall than a lower end of the heat exchanger is, and
an overlapping area between the projection area and the fire wall is larger on an upper side of the through hole than on a lower side of the through hole.

4. The air conditioning unit according to claim 1, wherein the air passage hole and the through hole are separated from each other by a remaining part of the fire wall.

5. The air conditioning unit according to claim 1, wherein the heat exchanger is arranged so that a part of the projection area is located inside of the air passage hole.

6. An air conditioning unit for a vehicle comprising:
a heat exchanger arranged in an engine compartment partitioned by a fire wall from a cabin of the vehicle so as to exchange heat between air and refrigerant;
a first case arranged in the engine compartment to house the heat exchanger; and
a second case arranged in the cabin to send air from the heat exchanger into the cabin, wherein
the heat exchanger includes a core portion through which a refrigerant passes and header tanks arranged at respective ends of the core portion to communicate with the core portion,
the fire wall has a through hole passing through the fire wall, the first case and the second case being connected to each other inside the through hole,
a projection area defined by projecting the core portion from a front to a rear of the vehicle has a rectangular shape,
the heat exchanger is arranged so that a part of the projection area is located inside of the through hole of the fire wall, and
the heat exchanger is arranged so that all corners of the projection area are outside the through hole of the fire wall.

7. The air conditioning unit according to claim 6, wherein the fire wall has an air passage hole that forms an air passage through which air flows between the cabin and the engine compartment, and
the heat exchanger is arranged so that an entire area of the air passage hole is outside the projection area.

8. The air conditioning unit according to claim 6, wherein
the fire wall has an air passage hole that forms an air passage through which air flows between the cabin and the engine compartment, and
the heat exchanger is arranged so that all corners of the projection area are outside the through hole and the air passage hole of the fire wall.

9. The air conditioning unit according to claim 7, wherein
the through hole and the air passage hole are formed in the fire wall as a single hole portion, and
the heat exchanger is arranged so that all corners of the projection area are outside the single hole portion of the fire wall.

10. The air conditioning unit according to claim 7, wherein
the air passage hole and the through hole are separated from each other by a remaining part of the fire wall.

11. The air conditioning unit according to claim 7, wherein
the heat exchanger is arranged so that a part of the projection area is located inside of the air passage hole.

\* \* \* \* \*